United States Patent [19]

Kaniut

[11] 4,025,007

[45] May 24, 1977

[54] SHIFTING HORIZONTAL TAIL WITH HELICAL MOTIONS

[76] Inventor: Herbert Kaniut, Orrerweg 33/35, 5000 Cologne 71, Germany

[22] Filed: Mar. 17, 1976

[21] Appl. No.: 669,374

Related U.S. Application Data

[63] Continuation-in-part of Ser. No. 508,319, Dec. 4, 1974, abandoned.

[30] Foreign Application Priority Data

Aug. 16, 1974 Germany .......................... 2439479

[52] U.S. Cl. .................................. 244/15; 244/43; 244/87
[51] Int. Cl.² ........................................... B64C 5/10
[58] Field of Search ................... 244/43, 13, 15, 46, 244/87, 89, 48, 42 D, 42 DA, 42 DB

[56] References Cited

UNITED STATES PATENTS

| | | | |
|---|---|---|---|
| 1,916,813 | 7/1933 | Sessa | 244/46 |
| 2,376,636 | 5/1945 | Thompson | 244/43 |
| 2,941,752 | 6/1960 | Gluhareff | 244/46 |
| 3,181,820 | 5/1965 | Burnelli | 244/87 |
| 3,478,989 | 11/1969 | Bielefeldt | 244/43 |
| 3,493,197 | 2/1970 | Spearman | 244/87 |

Primary Examiner—Trygve M. Blix
Assistant Examiner—Galen Barefoot

[57] ABSTRACT

An aircraft having a bulky propulsion system positioned near its symmetrical axis and utilizing two shifting horizontal tail halves that are moved rearwards and forwards along the outer side walls of two rear wing cantilevers for varying flight operations. The two horizontal tail halves change their lateral inclination angles during the shifting operations, and the propulsive jet streams of the engines are discharged between the two rear wing cantilevers.

9 Claims, 11 Drawing Figures

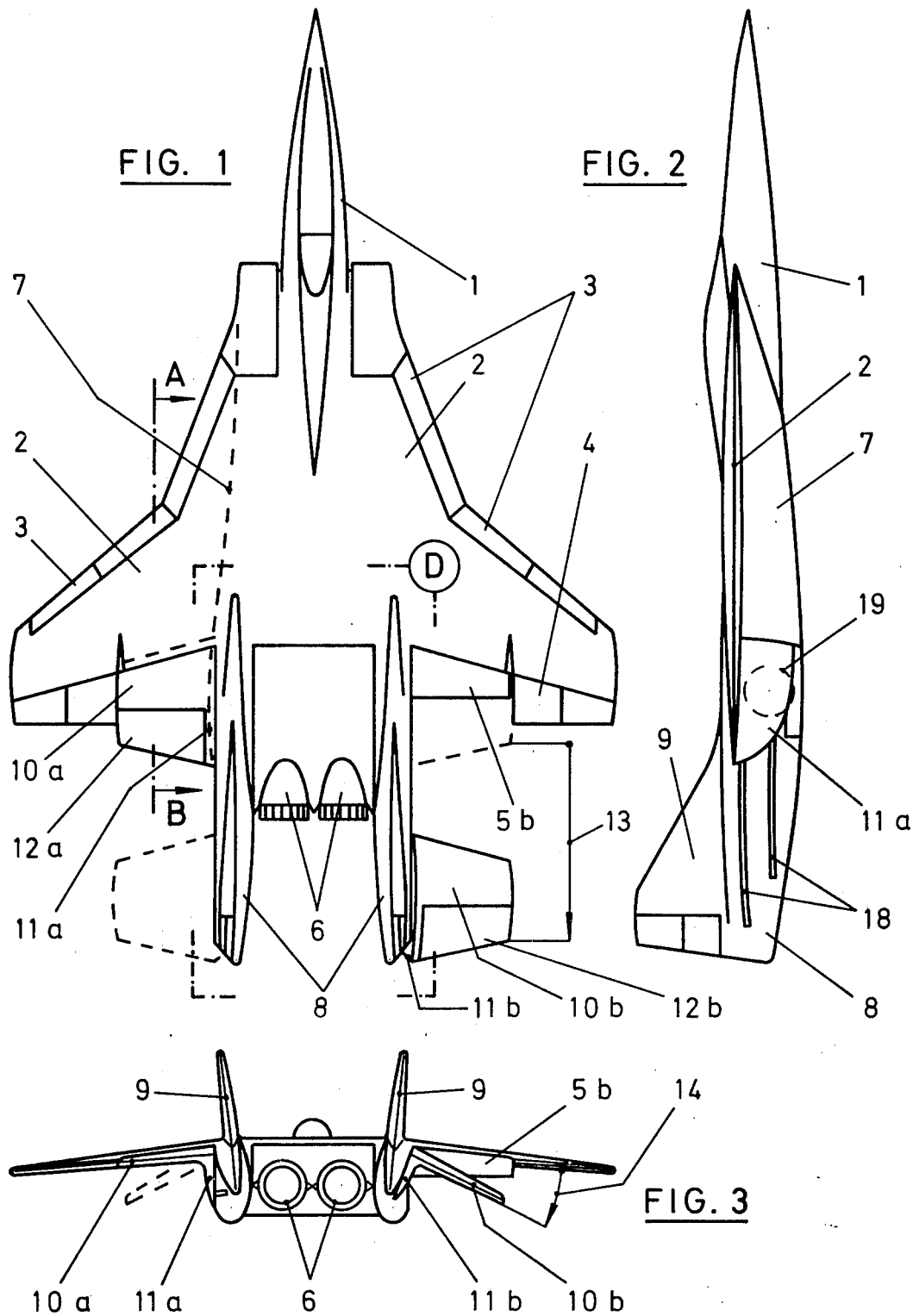

(SECTION A-B)

(FRAGMENT "C")

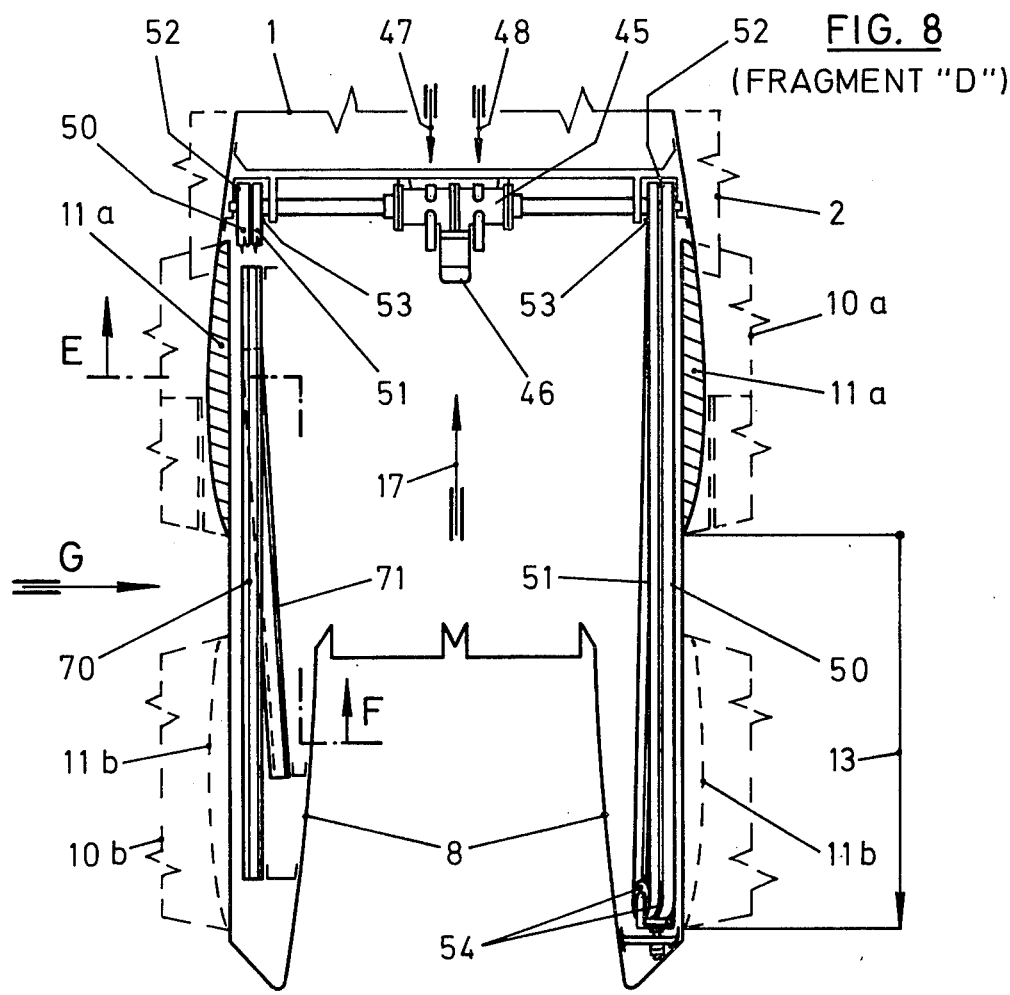
FIG. 8 (FRAGMENT "D")
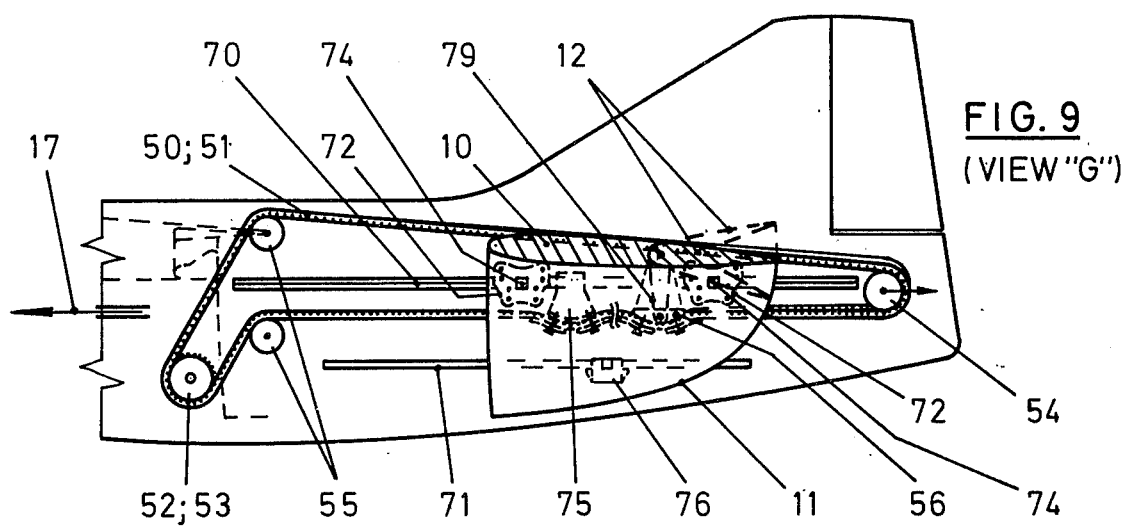
FIG. 9 (VIEW "G")

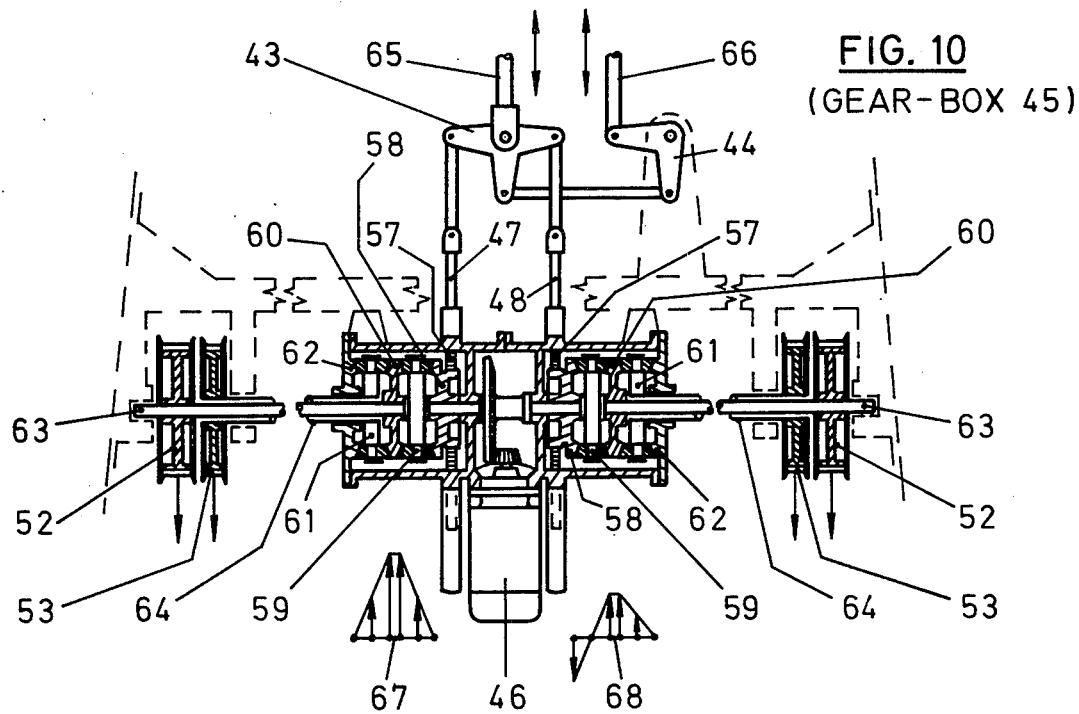
FIG. 10 (GEAR-BOX 45)
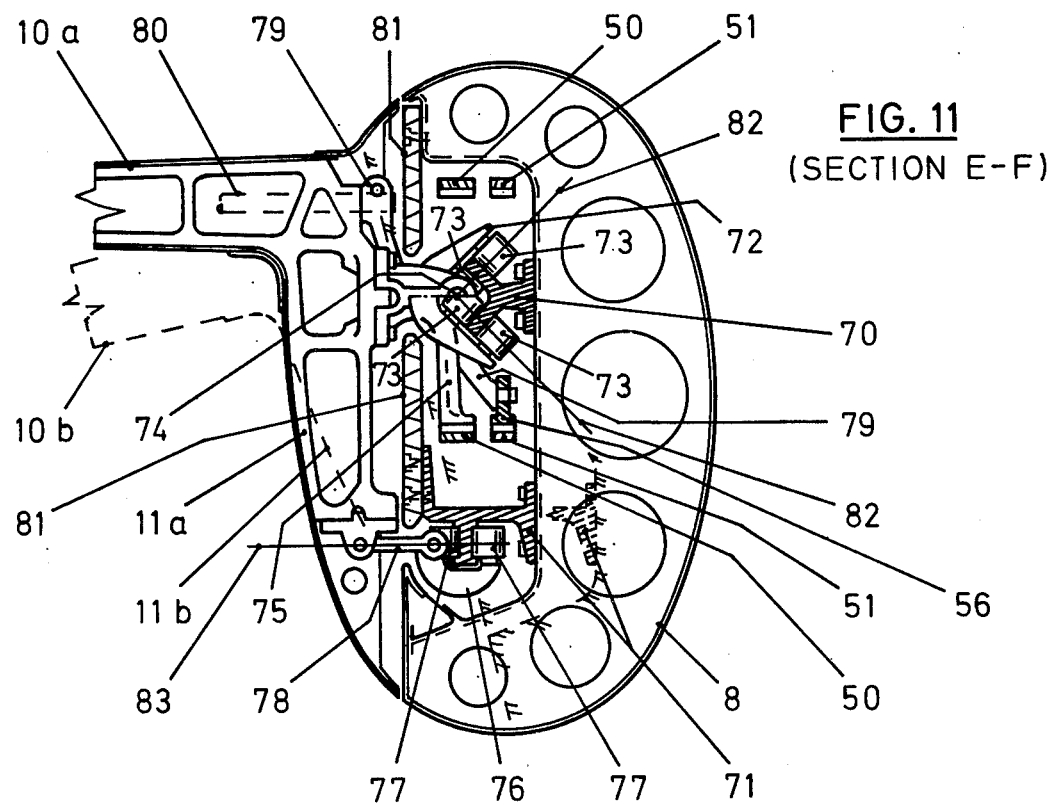
FIG. 11 (SECTION E-F)

SHIFTING HORIZONTAL TAIL WITH HELICAL MOTIONS

This application is a continuation-in-part of my co-pending application Ser. No. 508,319, filed Dec. 4, 1974, now abandoned.

BACKGROUND AND SUMMARY OF THE INVENTION

This invention relates to aerial vehicles, and relates in particular of fast aircraft having movable tail systems. One of the problems associated with the design of fast flying aircraft with movable tails is to find out suitable arrangments for the tail unit machinery which could favourably be packaged in the aircraft in addition to bulky propulsion systems and the remaining equipment. Since said propulsion systems together with big tank capacities are necessary for the high flight speeds to be obtained, the movable tail units must do with the remaining space, irrespective of the fact that they should be of light weight, not expensive, and reliably operating. And here begins the problem, because people skilled in the art know that it is already a bold attempt to package a voluminous propulsion system, retractable undercarriage, and other equipment, and that an additional accommodation of a movable tail system requires detailed space considerations connected with a very careful formation of parts. Thus it is less useful that submitted proposals —as sometimes observed — depend upon general ideas only. An opposite way of doing things would be more desirable, which is at the movable tail system:

to project its aggregates around the propulsion system, considering the real dimensions of them, and to conceive all engaged parts and their technical details in accordance with the actually available space and in line with the required function, if the proposed system should be appropriate for realization.

A method of improving the movable horizontal tail, as contemplated by the present invention, involves two sturdy rear wing-cantilevers with fixed vertical tails, and a bulky propulsion system positioned between them. The external side walls of said cantilevers embody rails on which two horizontal tail halves are moved rearwards and forwards. In the forward high-speed flight position the profile noses of the horizontal tail halves are accommodated inside of hollow trailing edges of the middle wings, and the landing flaps are lying flat below the horizontal tail halves. In this tail position the fixed wings, horizontal tails halves, and landing flaps are together forming compact supersonic air foil profiles without any lateral groove, which gives a minimum of supersonic impact wave resistance with a corresponding reduction in fuel consumption during high-speed flight. For low-speed flight the two horizontal tail halves are rolled rearwards and are laterally angularly moved down, forming near the aft ends of said rear wing-cantilevers a two-piece tail with an inverted V-shape, that acts as the horizontal tail.

Accordingly, it is an object of the present invention to provide a new and improved shifting horizontal tail for supersonic aircraft with bulky propulsion systems.

Another object of the present invention is to provide a new and improved shifting horizontal tail with a favourable arrangement of its aggregates within the aircraft structure.

Another object of the present invention is to provide a new and improved shifting horizontal tail with a minimum of supersonic impact wave resistance and with a reduced fuel consumption during high-speed flight.

Another object of the present invention is to provide a new and improved shifting horizontal tail increasing the lift of the aircraft during low-speed flight.

Another object of the present invention is to provide a new and improved shifting horizontal tail increasing the low-speed flight bad weather stability and control of the aircraft.

According to the present invention, the foregoing and other objects are attained by providing a shifting horizontal tail consisting of two independent tail halves, which are movably connected with two independent rear wing-cantilevers. The cantilevers are parts of an aircraft comprising fixed wings with slats, ailerons, landing flaps etc., a fuselage with two lateral engine intake tunnels, a bulky propulsion system, that for instance consist of two powerful jet engines, positioned between said rear wing-cantilevers, and two vertical tails on the aft ends of said cantilevers. The two horizontal tail halves are fastened to two chassis, and form with said chassis two angular monocoque constructions. The tail chassis carry trolleys with rollers which are engaging rails embodied in the external side walls of the rear wing-centilevers. For low-speed flight the two horizontal tail halves are rolled rearwards with simultaneous helical motions resulting in downward motions of both tail tips, and are forming in the rearward position a two-piece tail acting as the horizontal tail and having an inverted V-shape. For high-speed flight the two tail halves are rolled forwards with simultaneous helical motions resulting in upward motions of both tail tips, until the planes of the two tail halves substantially horizontally adjust to the planes of said wings, and the profile noses of the horizontal tail halves intrude into the hollow trailing edges of the wings.

Irrespective of the tail positions, the propulsion system at all times has an unobstructed discharge way between the rear wing-cantilevers.

BRIEF DESCRIPTION OF THE DRAWINGS

A more complete appreciation of the invention and many of the attendant advantages thereof will be readily apparent by reference to the following detailed description when considered in connection with the accompanying drawings wherein:

FIG. 1; FIG. 2 and FIG. 3 show a supersonic aircraft. FIG. 1 is the upper plan view, FIG. 2 the side elevational view, and FIG. 3 the rear view of the aircraft. The left side of FIG. 1, FIG. 2, and the left side of FIG. 3 illustrate the shifting horizontal tail in its forward high-speed flight position, whereas the right side of FIG. 1 and the right side of FIG. 3 illustrate the shifting horizontal tail in its rearward low-speed flight position. In FIG. 1 and in FIG. 3 the dash lines show the respective different positions of the shifting horizontal tail.

FIG. 8 is the fragment D of FIG. 1, and shows (after removal of the aircraft skin) a plan view of the shifting means for the horizontal tail halves.

FIG. 9 is the view in direction of arrow G of FIG. 8, and shows (after removal of the aircraft skin) a side elevational view of the shifting means for the horizontal tail halves.

FIG. 10 shows the gear-box 45 of FIG. 8 in a sectional view, together with the driving shafts 63; 64, and the driving sprockets 52; 53 for the teeth-belts.

FIG. 11 is a section taken along line E – F of FIG. 8, illustrating the cross-section of the rear wing-cantilever and of the tail chassis, together with the rails and the trolleys.

DETAILED DESCRIPTION OF OPERATION

Figure 4:
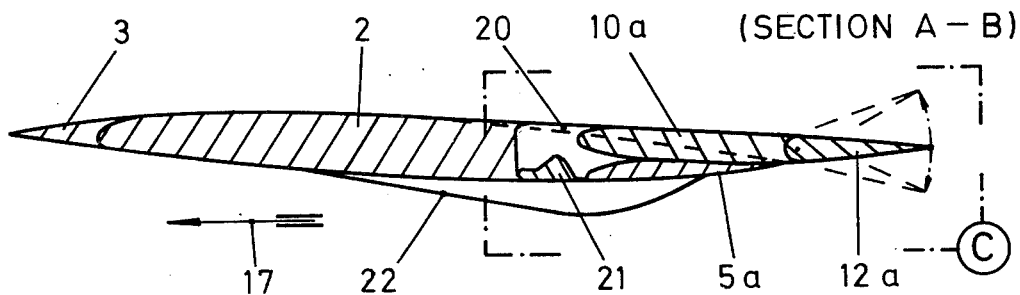
FIG. 4 is a section taken along line A — B of FIG. 1, illustrating the high-speed flight arrangement of the slat, fixed wing with an upper wing thickening, horizontal tail in its forward position, elevator in its forward position, landing flap not angaged, and auxiliary flap, — all these parts together forming a compact supersonic air foil profile without any lateral groove.

Referring now more particularly to the drawings wherein like reference numerals designate identical parts in each of the views, and more particularly to FIG. 1; FIG. 2 and FIG. 3, there are:
1. fuslage;
2. fixed wings;
3. slats;
4. ailerons;
5. landing flaps;
5a. landing flaps not engaged;
5b. landing flaps engaged;
6. jet engines;
7. intake tunnels for the jet engines 6;
8. rear wing-cantilevers;
9. vertical tails;
10. horizontal tail halves;
10a. horizontal tail halves in their forward high-speed flight position;
10b. tail halves in their rearward low-speed flight position;
11. two chassis of the horizontal tail halves;
11a. chassis in their forward high-speed flight positions;
11b. chassis in their rearward low-speed flight positions;
12. elevator halves or elevons;
12a. elevator halves in their forward high-speed flight position;
12b. elevator halves in their rearward low-speed flight position;
13. stroke of the tail shifting;
14. lateral downward turning angles of the horizontal tail halves;
18. slits in the external side walls of the cantilevers 8;
19. retracted undercarriage.

Each half of the horizontal tail 10 (with positions 10a and 10b) is fastened to a tail-chassis 11 (with positions 11a and 11b) together forming an angular monocoque construction. Both tail-chassis 11 carry trolleys with rollers which are engaging rails embodied in the external side walls of the rear wing-cantilevers 8. For low-speed flight both chassis 11 with both halves of the horizontal tail 10 are rolled rearwards into the position 10b; 11b, simultaneously and with mirror inverted helical motions being angularly turned down 14, and forming in the rearward position 10b a two-piece tail acting as the horizontal tail and having an inverted V-shape. For high-speed flight both chassis 11 with both tail halves 10 are rolled forwards into the position 10a; 11a simultaneously and with mirror inverted helical motions being angularly turned upwards, until the planes of both said tail halves adjust to the planes of the wings 2, and the profile noses of both tail halves 10a intrude into the hollow trailing edges of the wings 2.

The propulsion system 6 is positioned between the two sturdy rear wing-cantilevers 8, and at all times has an unobstructed discharge way between the cantilevers 8.

Figure 5:
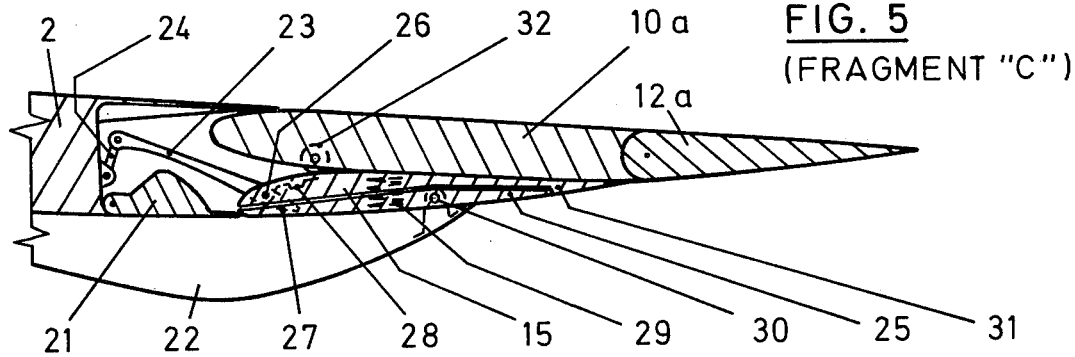
FIG. 5 is the fragment C of FIG. 4, and shows in an enlarged view the details of the high-speed flight arrangement of the rear end of the fixed wing, horizontal tail, elevator, landing flap and auxiliary flap.
Figure 6:
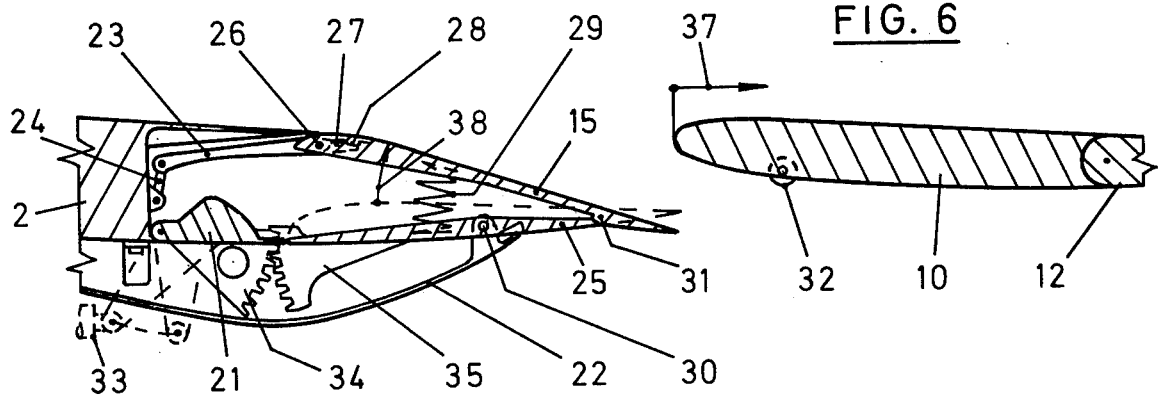
FIG. 6 shows the same fragment as FIG. 5, but with the horizontal tail being moved rearwards.

Referring more particularly to FIG. 4; FIG. 5; FIG. 6; and FIG. 7, there are:
15. upper panel of landing flap 5;
17. direction of flight;
20. upper wing thickening;
21. auxiliary flap of a torsion-proof design, driven by actuator 33;
22. support beam for the landing flaps, having an U-shape cross-section;
23. lever;
24. connecting rod;
25. lower panel of landing flap 5;
26. swivel joint between the lever 23 and the upper panel 15 of the landing flap;
27. stop arm of lever 23;
28. stop buffer for stop arm 27;
29. pressure spring;
30. turning axis and turning joints of the landing flap;
31. turning band between the upper and the lower panel, 15 and 25, of the landing flap;
32. rollers;
33. landing flap actuator;
34. gear segment, attached to the auxiliary flap 21;
35. gear segment, attached to the lower panel of the landing flap 25;
36. air passage;
37. rearward motion of the horizontal tail 10;
38. upward motion of upper panel 15 panel of the landing flap;
39. upward motion of the auxiliary flap 21;
40. turning motion of lower panel 25 of the landing flap;
41. downward motion of the nose of the landing flap;
42. air jet;

The remaining reference numerals are as specified above.

For high-speed flight, FIG. 4 and FIG. 5, the forwards moved horizontal tail half 10a intrudes into the hollow trailing edge of the wing 2, pressing down the upper panel 15 of the landing flap 5 by means of the rollers 32. The landing flap 5 and its turning axis 30 is supported on support beams 22, which are fastened to the wing 2. The levers 23 and connecting rods 24 are inactive. For low-speed flight the horizontal tail half 10 is moved rearwards 37, releasing its pressure on the upper panel 15. The springs 29 push upwards 38 the upper panel 15, taking up the levers 23 until their stop arms 27 strike against the stop buffers 28, and the hollow trailing edge of the wing 2 get a favourable fairing by the upper panel 15, FIG. 6.

Figure 7:
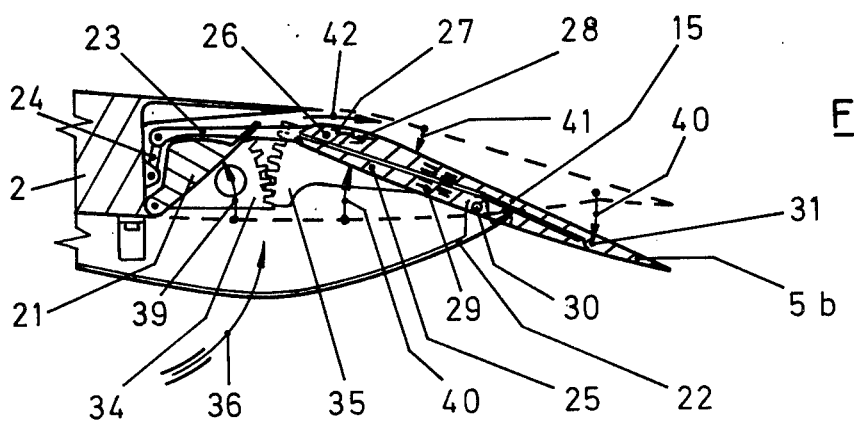
FIG. 7 shows the same fragment as FIG. 6, but with the engaged landing flap.

For landing operations the landing flaps will be engaged 5b, FIG. 7, and will be partly engaged for takeoff operations. This is accomplished by the actuator 33 (positioned inside of the fuselage), which moves upward 39 the auxiliary flap 21 with its gear segment 34. The gear segment 34 is in mesh with a second gear segment 35 — the pair(s) of gear segments being positioned inside of the support beams 22 — and turnes 40 the lower panel 25 of the landing flap, providing a downward motion of the upper panel 15, at its trailing edge 40 and at its leading edge 41. The downward motion 41 of the leading edge is attained by the levers 23 which, stopped in their relative motion to the upper panel 15 by the stop arms 27 pressing the stop buffers 28, form together with the upper panel 15 a bending-proof body. This common bending-proof body downwards moved at its rear end 40 will be downwards moved in its middle 41. Thus is provided an air passage 36 from the lower to the upper side of the engaged landing flap with a rearward air jet 42 over the landing flap.

Referring more particularly to FIG. 8 and FIG. 9, there are:

45. gear-box horizontal tail motion and for elevator or elevon control;
46. motor for horizontal tail motion;
47. control input for the left elevator half or the left elevon;
48. control input for the right elevator half or the right elevon;
50. toothed-belts or roller chains (forming endless flexible drive means) for horizontal tail motions;
51. toothed-belts or roller chains (forming endless flexible drive means) for elevator or elevon control;
52. driving sprockets for horizontal tail motions;
53. driving sprockets for elevator or elevon control;
54. inclined idlers;
55. support rollers;
56. toothed-belt clamp or roller chain clamp with a driving eye incorporating a swivel joint;
70. main rail, having a Y-shaped cross-section with a bottom fastening flange, for the rearward and forward motions of the horizontal tail;
71. auxiliary rail for the rearward and forward motions of the horizontal tail;
72. main trolleys of the horizontal tail halves, having an angular shape. Two trolleys for each horizontal tail half;
74. spherical joints between the trolleys 72 and the chassis 11 (having end-positions 11a and 11b), inside of the channel of the rail 70;
75. driving bracket for each horizontal tail half with a toothed-belt clamp or roller chain clamp, fastened to the chassis 11 between the two main trolleys 72;
76. auxiliary trolley of the horizontal tail halves;
79. elevator or elevon control lever;

The remaining reference numerals are as specified above.

The rails embodied in the external side walls of the rear wing-cantilevers 8 consist of upper main rails 70 and lower auxiliary rails 71, from which the main rails 70 are substantially parallelly positioned to the direction of flight, whereas the auxiliary rails 71 have angular directions to the directions of the main rails 70, FIG. 8, so that in the aircraft plan view both auxiliary rails 71 are converging towards the rear. These non-parallel main- and auxiliary rails 70 and 71 give said mirror inverted helical motions of both horizontal tail halves during their rearward and forward motions, because the two main trolleys 72 of each tail chassis 11 are rolling along the main rail 70 whereas the auxiliary trolley 76 is rolling along the auxiliary rail 71, FIG. 9.

Each horizontal tail half 10 and chassis 11 is moved rearwards and forwards by means of a toothed-belt or roller chain 50, while the control of the elevator half or of the elevon 12 during said rearward or forward motions of the horizontal tail half is attained by a second toothed-belt or roller chain 51, lying side by side with the toothed-belt or roller chain 50, FIG. 8. Both toothed-belts or roller chains 50; 51 on each aircraft side are driven by forward sprockets 52; 53, are tensioned by rear idlers 54, which have inclined idler axes to correspond with the angular directions of the auxiliary rails 71, and are held in position by support rollers 55.

The chassis 11 has a stiffly fastened driving bracket 75, which is connected with the toothed-belt or roller chain 50 by means of a toothed-belt clamp or a roller chain clamp consisting of a convex curved toothed-segment and two retaining brackets of a stretched S-shape fitted at the ends of the toothed-segment, and which press the toothed-belt or roller chain 50 round the toothed-segment. The second toothed-belt or roller chain 51 is connected with the elevator half or elevon 12 by means of a toothed-belt clamp or a roller chain clamp 56, being of a similar design as the toothed-belt clamp or roller chain clamp of the chassis 11, but having an additional driving eye whoses center point substantially lies on the tensile force-line of the toothed-belt or roller chain. The driving eye is equiped with a swivel joint which engages the elevator control lever 79. The lever 79 is fastened to the elevator control shaft 80, FIG. 9 and FIG. 11. The driving sprockets 52; 53 are connected with the common gear-box 45.

Referring more particularly to FIG. 10, there are:

43. twin angular lever;
44. angular lever;
57. toothed racks;
58. freely rotating spur gears with bevel gears;
59. 1st bevel differential gears, fastened to the inner shaft 63;
60. freely rotating double side bevel gears;
61. 2nd bevel differential gears, fastened to the hollow shafts 64;
62. bevel gears fastened to the housing;
63. common inner shaft;
64. hollow shafts;
65. longitudinal control commands from the pilot or autopilot;
66. lateral control commands from the pilot or autopilot;
67. kinematical gear diagram for rearward and forward motions of the horizontal tail halves, mirror inverted for both sides;
68. kinematical gear diagram for control commands, mirror inverted for both sides;

The remaining reference numerals are as specified above.

The driving sprockets 52 for the rearward and forward motions of the horizontal tail halves on both aircraft sides are fastened to a common inner shaft 63, which is driven by the motor 46, controlled by the pilot.

The driving sprockets 53 for the elevator or elevon control on both aircraft sides are fastened to two hollow shafts 64 — one hollow shaft on each aircraft side — which are coaxially positioned with the shaft 63, and which are driven by the gear-box 45.

A set of angular levers 43; 44, and the gear-box 45 combine the longitudinal control commands 65 and lateral control commands 66 from the pilot or autopilot with the rearward and forward motions of the horizontal tail halves, which result in compound driving motions for the control sprockets 53. The twin angular lever 43 introduces equal control inputs for the left elevator half 47 and for the right elevator half 48 when a pure elevator action is required, but the twin lever 43 by help of the angular lever 44 produces differential control inputs 47; 48, when the elevator halves are used as elevons. The control inputs 47; 48 are controlling two separate gear sets which mirror inverted are positioned in the left area and in the right area of the common gear-box 45. Both of the gear sets have symmetrical kinematical gear diagrams 67 when the horizontal tail halves are moved rearwards or forwards, and no control input for the elevator halves or elevons takes place. But both the gear sets have asymmetrical kinematical gear diagrams 68 with gear ratios of 1:2 when control inputs for the elevator halves or elevons take place, and no tail motion is carried out. And both kinematical gear diagrams 67 and 68 of both gear sets are superposed when control inputs for the elevator halves or elevons take place during the rearward or forward motions of the horizontal tail halves.

Referring more particularly to FIG. 11, there are:
73. rollers of the main trolleys 72, fitted on protruding shafts, eight rollers for each trolley 72;
77. rollers of the auxiliary trolley 76, fitted on protruding shafts, four rollers for each rolley 76;
78. link between the auxiliary trolley 76 and the chassis 11 (11a; 11b), with two swivel joints; one joint being spherical;
80. elevator or elevon control shaft;
81. removable panels;
82. symmetrical planes of the rollers 73;
83. symmetrical planes of the rollers 77;

The remaining reference numerals are as specified above.

The main rails 70 have a Y-shaped cross-section with a bottom fastening flange. The main rails are turned about 90° into the horizontal plane, with the open channels of both Y-shaped lying externally. The open channel of each main rail 70 consists of two single rails having an angle of substantially 90° between them, so that both single rails stand with angles of substantially 45° in relation to the horizontal plane.

Each main trolley 72 has a bending-proof body of an angular shape, consisting of two flat body parts having an angle of substantially 90° between them. Each said flat body part stands at a right angle to each of said single rails, with the rail edge lying close to the middle of the flat body part. Each flat body part has four parallelly protruding shafts arranged in a rectangle, FIG. 9, — two of them on each side of the single rail, and two of them being adjustable — on which are fitted four broad rollers 73. Herewith a complete main trolley 72 has a total of eight rollers 73, arranged in two sets, which in line with said single rails — that stand to each other with an angle of substantially 90° — also stand to each other with substantially rectangular shafts. In the middle between the rollers 73 is positioned a spherical joint 74, FIG. 9, which connects the main trolley 72 with the chassis 11 by means of an outrigger, FIG. 11, and the spherical joint 74 is positioned inside of the open channel of the main rail 70 in such a way that spherical joint 74 substantially lies on the intersection line (shown as an intersection point) between two symmetrical planes 82 of the rollers 73, by which position all lateral forces going through the spherical joint 74 are substantially symmetrically loading all rollers 73.

The auxiliary trolley 76 has a flat bending-proof body with four parallelly protruding shafts arranged in a rectangle - two of them being adjustable — on which are fitted four rollers 77. The auxiliary trolley 76 is connected with the chassis 11 by means of a link 78 having two swivel joints with parallel axes, of which one joint is spherical. The link joints are substantially lying on the summetrical plane 83 of the rollers 77.

The rear wing-cantilevers 8 are on their external side walls covered with removable panels 81 fastened to the cantilever-structures and to the auxiliary rails 71, whilst small gaps let freely between the panels and the lower edges of said structures form the slits 18. Said external side walls and said removable panels 81 are mirror invertedly twisted towards the rear, enabling the helical and mirror inverted motions of said rearwards and forwards rolled horizontal tail halves.

This description presents a preferred embodiment of the invention. Alternations and modifications may occur to those skilled in the art which are included within the scope of the following

What I claim is:
1. In a supersonic aircraft with a bulky propulsion system having a shifting horizontal tail which is movable in longitudinal direction of the aircraft and which for low-speed flight and particularly for takeoff and landing is moved to a rearward position but which the high-speed flight is moved to a forward position (FIG. 1; FIG. 2; FIG. 3 and FIG. 4) the improvement comprising:

fixed wings (2) having upper thickenings (20) at the middle portions of the trailing edges of the wings, and being equipped with slats (3), ailerons (4), landing flaps (5),
a fuselage (1) positioned substantially on the bottom sides of said wings,
(a) the said fuselage having two lateral engine intake tunnels (7),
two rear wing-cantilevers (8) protruding from said wings rearwards,
(a) the said two cantilevers (8) being the external and rear extensions of said two engine intake tunnels (7),
(b) external side walls of said cantilevers embodying slits (18), upper main rails (70), and lower auxiliary rails (71) (FIG. 2; FIG. 8; FIG. 9 and FIG. 11) for the rearward and forward motion of the horizontal tail,
c. said main rails (70) having a Y-shaped cross-section with a bottom fastening flange (FIG. 11), said Y-shape being turned about 90° into the horizontal plane and positioned mirror inverted on both aircraft sides so that said fastening flanges of the left and of the right rails (70) are directed to each other and the open channels of said both Y-shapes are lying externally (FIG. 11), and said main rails (70) on both aircraft sides being positioned substantially parallelly to the direction of flight, if seen in the aircraft plan view (FIG. 8),
d. said auxiliary rails (71) being positioned below of said main rails (70), and having angular directions to the directions of said main rails (70) so that in the aircraft plan view both said auxiliary rails (71) are converging towards the rear (FIG. 8 and FIG. 11),
e. each said cantilever carrying a fixed vertical tail (9) on its aft end,
f. the undercarriage (19) being retracted into said two cantilevers, g. the jet engines (6) being positioned between said two cantilevers, a horizontal tail (10 with positions 10a; 10b) consisting of two horizontal tail halves, a. each half of said horizontal tail being fastened to a chassis (11 with positions 11a; 11b) of a longitudinal and airflow suitable shape, b. each half of said horizontal tail forming together with said chassis an angular monocoque construction, c. each said chassis (11) having two upper main trolleys (72) with rollers (73) engaging said upper main rail (70) and one lower auxiliary trolley (76) with rollers (77) engaging said lower auxiliary rail (71) (FIG. 9 and FIG. 11), d. the said two horizontal tail halves and two chassis being for low-speed flight rolled rearwards with simultaneous and mirror inverted helical motions of both said horizontal tail halves resulting in downward motions of both horizontal tail tips, and forming in the rearward position (10b) a two-piece tail acting as the horizontal tail and having an inverted V-shape (FIG. 3 and FIG. 11), e. the said two tail halves and two chassis being for high-speed flight rolled forwards with simultaneous and mirror inverted helical motions of both said tail halves resulting in upward motions of both tail tips, until the planes of both said tail halves substantially horizontally adjust to the planes of said wings (2) and the profile noses of said two tail halves intrude into the hollow trailing edges of said wings (2)(FIG. 3; FIG. 4 and FIG. 5), and which is the forward position (10a) of said horizontal tail halves, f. the said horizontal tail halves having lateral dimensions with which they fit between said ailerons (4) and said cantilevers (8), g. the said horizontal tail halves having longitudinal control elevators or elevons (12 with positions 12a; 12b) positioned along the trailing edges of said horizontal tail halves, h. the said horizontal tail halves in their forward high-speed flight positions (10a) being placed near the upper sides of said hollow wing trailing edges (FIG. 4 and FIG. 5) which is accomplished by said upper wing thickenings (20), whereas the not engaged landing flaps (5a) are placed near the bottom sides of said hollow wing trailing edges and said landing flaps are lying flat below said horizontal tail halves with the trailing edge of said landing flaps positioned in front of the leading edges of said elevators or elevons, and said slats (3), said wings (2) with said upper wing thickenings (20), said horizontal tail halves (10a) with said elevators or elevons (12a), said landing flaps (5a), and auxiliary flaps (21) are together forming a compact supersonic air foil profile without any lateral groove and with a minimum of air impact wave resistance (FIG. 4), i. the said both chassis (11) being joined in airflow suitable manners to said external side walls of said cantilevers (8) particularly during high-speed flight (11a)(FIG. 1; FIG. 2 and FIG. 8), j. each said horizontal tail half (10) and chassis (11) being moved rearwards and forwards by means of an endless flexible drive means, preferably by a toothed-belt (50)(FIG. 8 and FIG. 9), k. each said elevator or elevon (12) being controlled during said rearward and forward motions of said horizontal tail half as well as in the end positions of said motions (12a and 12b) by means of a second endless flexible drive means, preferably by a second toothed-belt (51), having smaller cross-section dimensions than said endless flexible drive means (50), and lying side by side with said endless flexible drive means (50)(FIG. 8; FIG. 9 and FIG. 11), l. both said endless flexible drive means (50; 51) on each aircraft side being positioned inside of said cantilever (8) and forming loops therein, being driven by forward sprockets (52; 53), being tensioned by rear idlers (54) having inclined idler axes to correspond with said angular direction of said auxiliary rail (71), being held in position by support rollers (55), and having said main rail (70) positioned inside of said endless flexible drive means loops, whereas said auxiliary rail (71) is positioned below and outside of said endless flexible drive means loops (FIG. 9 and FIG. 11), m. said driving sprockets (52) for said rearward and forward motions of said horizontal tail halves on both aircraft sides being fastened to a common inner shaft (63) which is driven by a motor (46), controlled by the pilot (FIG. 8 and FIG. 10), n. said driving sprockets (53) for said elevator or elevon control on both aircraft sides being fastened to two hollow shafts (64) — one said hollow shaft for each aircraft side — which are positioned coaxially with said shaft (63), and which are driven by a gear-box (45) receiving the longitudinal control commands (65) and lateral control commands (66) via a set of angular levers (43; 44) from the pilot or auto-pilot.

2. The aircraft of claim 1 wherein both said horizontal tail halves during said rearward motion are getting continuously increasing positive angles of incidence in relation to the local streamline directions to produce additional lift during low-speed flight, which is accomplished by a corresponding curvature of said rails (70 and 71) and of said slits (18) in vertical planes (FIG. 2), and which positive angles of incidence are continuously turned back during said forward motion of said tail halves.

3. The aircraft of claim 1 wherein each said landing flap (5 with positions 5a; 5b) is divided into an upper panel (15) and a lower panel (25), which near to their trailing edges are connected with each other by means of a turning band (31), whereas said lower panel (25) incorporates the turning axis of said landing flap (30) and the turning joints connecting said landing flap with several support beams (22) of U-shape cross-section which are fastened to said fixed wing (2)(FIG. 5 to FIG. 7), whilst between said landing flap and the lower rear skin end of said fixed wing is inserted an inclinable auxiliary flap (21) having a torsion-proof design and being driven by the landing flap actuator (33) positioned inside of said fuselage, and said auxiliary flap (21) carries gear segments (34) which are in mesh with corresponding gear segments (35) attached to said lower panel (25) so that upward and downward motions of said auxiliary flap (21) result in engagement and disengagement motions of said landing flap, whereas said pairs of gear segments (34; 35) are positioned inside of said U-shaped support beams (22)(FIG. 6), and between said upper and lower panels (15 and 25) of the landing flap are installed pressure springs (29) pushing said upper panel (15) upwards (38), and said upper panel has on its leading edge several swivel joints (26) with forwards protruding levers (23) which at their forward ends are supported on the structure of said wing (2) by means of hinged connected rods (24), and the rear ends of said levers (23) have stop arms (27) which in the upper position of said upper panel (15) strike against stop buffers (28) positioned inside of said upper panel (15) (FIG. 6), whilst said horizontal tail (10) has rollers (32), partly sunk in its lower profile nose skin, which in said forward position (10a) of said horizontal tail press down said upper panel (15) providing admission for said profile nose into said hollow trailing edge of said wing (2)(FIG. 5), whereas said rearward motion (37) of said horizontal tail releases the pressure on said upper panel (15) and said springs (29) push upwards (38) said upper panel (FIG. 6), and the engagement motion of said landing flap, connected with said upward moved (39) auxiliary flap (21) that turns said lower panel (25) of said landing flap (40), provides a downward motion of said upper panel (15) at its trailing edge (40) and at its leading edge (41), the last motion being accomplished by said levers (23) and their stop arms (27) pressing said stop buffers (28), which provides an air passage (36) from the lower to the upper side of the engaged landing flap with a rearward air jet (42) over said landing flap (FIG. 7).

4. The aircraft of claim 1 wherein said set of angular levers and said gear-box (45) are combining said longitudinal control commands (65) and lateral control commands (66) with said rearward and forward motions of said horizontal tail halves which result in compound driving motions for said control sprockets (53) (FIG. 10), wherein a twin angular lever (43) introduces equal control inputs for the left elevator half (47) and for the right elevator half (48) when a pure elevator action is required, but said twin lever by help of the angular lever (44) produces differential control inputs (47 and 48) when said elevator halves are used as elevons, whilst said control inputs (47 and 48) are controlling two separate gear sets which are mirror inverted positioned in the left area and in the right area of a common gear-box (45), and each said gear set is composed of a control input toothed rack (57), which is in mesh with a freely rotating spur gear with a bevel gear (58), a 1st bevel differential gear (59), whose satellite carrier is fastened to said common inner shaft (63), a freely rotating double side bevel gear (60), a 2nd bevel differential gear (61), whose satellite carrier is fastened to said hollow shaft (64), and a bevel gear (62) fastened to the housing, whereat both said gear sets have symmetrical kinematical gear diagrams (67) when said horizontal tail halves are moved rearwards or forward and no control input for said elevator halves or elevons take place, but both said gear sets have asymmetrical kinematical gear diagrams (68) with gear ratios of 1 : 2 when control inputs for said elevator halves or elevons take place and no tail motion is carried out, and both said kinematical gear diagrams (67 and 68) of both said gear sets are superposed when control inputs for said elevator halves or elevons take place during said rearward or forward motions of said horizontal tail halves, and wherein said gear sets at least have said simple bevel gear design, resulting in the smallest possible number of parts.

5. The aircraft of claim 1 wherein each said open channel of said main rails (70)(FIG. 11) consists of two single rails having an angle of substantially 90° between them so that both said single rails substantially stand with angles of 45° in relation to the horizontal plane, and each said main trolley (72) has a bending-proof body of an angular shape consisting of two flat body parts having an angle of substantially 90° between them, and each said flat body part stands at a right angle to each of said single rails with the rail edge lying close to the middle of said flat body part (FIG. 11), whilst each said flat body part has four parallelly protruding shafts arranged in a rectangle (FIG. 9), two of them on each side of said single rail and two of them being adjustable, on which are fitted four broad rollers (73) (FIG. 11) wherewith a complete main trolley (72) has a total of eight rollers (73) arranged in two sets, which in line with said single rails are standing to each other with substantially rectangular shafts, and in the middle between said rollers (73) is positioned a spherical joint (74)(FIG. 9) which is attached to said main trolley body and which connects said main trolley (72) with said chassis (11) by means of an outrigger (FIG. 11), and said spherical joint (74) is positioned inside of said open channel of said main rail (70) in such a way that said spherical joint (74) substantially lies on the intersection line (in FIG. 11 shown as an intersection point) between two symmetrical planes (82) of said rollers (73), by which position all lateral forces going through said spherical joint (74) are substantially symmetrically loading all said rollers (73).

6. The aircraft of claim 1 wherein each said auxiliary trolley (76) has a flat bending-proof body with four parallelly protruding shafts arranged in a rectangle, two of them being adjustable, on which are fitted four rollers (77)(FIG. 11), and said auxiliary trolley (76) is connected with said chassis (11) by means of a link (78) having two swivel joints with parallel axes, of which one joint is spherical, and said link joints are substantially lying on the symmetrical plane (83) of said rollers (77).

7. The aircraft of claim 1 wherein each said endless flexible drive means (50) of said horizontal tail motion is connected with said chassis (11) by means of a driving bracket (75)(FIG. 9 and FIG. 11), which is stiffly fastened to said chassis (11) betweeen the two said main trolley (72), and which is connected with said endless flexible drive means (50) by means of a clamp consisting of a convex curved toothed-segment and two retaining brackets of a stretched S-shape fitted at the ends of said toothed-segment.

8. The aircraft of claim 1 wherein each said endless flexible drive means (51) for said elevator or elevon control is connected with said elevator half or elevon (12) by means of a clamp (56), consisting of a convex curved toothed-segment and two retaining brackets of a stretched S-shape fitted at the ends of said toothed-segment, and having a driving eye whose center point substantially lies on the tensile force-line of said endless flexible drive means (FIG. 9), and said driving eye is equiped with a swivel joint which engages the elevator control lever (79), whereas said lever is fastened to the elevator control shaft (80) (FIG. 9 and FIG. 11).

9. The aircraft of claim 1 wherein said rear wing-cantilevers (8) are on their external side walls covered with removable panels (81) fastened to the cantilever-structures and to the auxiliary rails (71), whilst small gaps let freely between said panels and the lower edges of said structures provide for said slits (18), and said external side walls and said removable panels (81) are mirror invertedly twisted towards the rear, enabling said helical and mirror inverted motions of said rearwards and forwards rolled horizontal tail halves.

* * * * *